(12) United States Patent
Lemaire et al.

(10) Patent No.: US 8,583,618 B2
(45) Date of Patent: Nov. 12, 2013

(54) DETERMINATION OF GRAPHICAL FORMAT TO PRESENT SEARCH RESULTS

(75) Inventors: Mathieu Lemaire, Paris (FR); Steve N. Kopp, La Garenne Colombes (FR); Alexis L. Naibo, Levallois-Perret (FR)

(73) Assignee: Business Objects S.A., Levallois-Perret (FR)

( * ) Notice: Subject to any disclaimer, the term of this patent is extended or adjusted under 35 U.S.C. 154(b) by 950 days.

(21) Appl. No.: 12/276,561

(22) Filed: Nov. 24, 2008

(65) Prior Publication Data

US 2010/0131491 A1    May 27, 2010

(51) Int. Cl.
  *G06F 17/30* (2006.01)
  *G06F 7/00* (2006.01)
(52) U.S. Cl.
  USPC ............................. 707/706; 707/708
(58) Field of Classification Search
  USPC ................. 707/707, 767, 706, 708
  See application file for complete search history.

(56) References Cited

U.S. PATENT DOCUMENTS

| | | |
|---|---|---|
| 7,493,330 B2 | 2/2009 | Cubranic |
| 8,219,560 B2 | 7/2012 | Abhyankar et al. |
| 2004/0068697 A1* | 4/2004 | Harik et al. ................. 715/513 |
| 2006/0224552 A1* | 10/2006 | Riezler et al. .................... 707/1 |
| 2007/0112744 A1* | 5/2007 | Arrouye et al. ................... 707/3 |
| 2008/0082578 A1* | 4/2008 | Hogue et al. ............... 707/104.1 |
| 2008/0109285 A1* | 5/2008 | Reuther et al. .................... 705/7 |
| 2008/0294663 A1* | 11/2008 | Heinley et al. ................ 707/100 |
| 2008/0295016 A1* | 11/2008 | Audet .......................... 715/772 |
| 2009/0234814 A1* | 9/2009 | Boerries et al. .................. 707/3 |
| 2010/0094823 A1 | 4/2010 | Lemaire |

* cited by examiner

*Primary Examiner* — Jacob F Bétit
*Assistant Examiner* — John P Hocker
(74) *Attorney, Agent, or Firm* — Buckley, Maschoff & Talwalkar LLC (57) ABSTRACT

Some aspects include reception of a plurality of search results, selection of a graphical format in which to present the search results from a plurality of graphical formats based on metadata of the plurality of search results, and presentation of the plurality of search results in the selected graphical format.

32 Claims, 8 Drawing Sheets

Search Query: "Business Objects"

Search Results (Displaying 1 to 8)

Business Intelligence from Business Objects
Business intelligence software and solutions including the BI industry's most advanced and complete solution for performance management, planning, ...

Business Intelligence from Business Objects
Business Objects offers a broad family of tools and applications to help teams optimize business performance by connecting people, information and ...
www.businessobjects.com/product/

Business Objects (company) - Wikipedia, the free encyclopedia
Business Objects (a.k.a. BOBJ) is a French enterprise software company, specializing in business intelligence (BI). It is now part of SAP AG. ...
en.wikipedia.org/wiki/Business_Objects_(company)

Business object (computer science) - Wikipedia, the free encyclopedia
Business objects are objects in an object-oriented computer program that represent ...
Business objects are sometimes called domain objects; a domain model ...
en.wikipedia.org/wiki/Business_object_(computer_science)

Business Objects Labs
labs.businessobjects.com, Business Objects technology playground.
labs.businessobjects.com/

Business Objects Belux
Business Objects is the world's leading provider of enterprise business intelligence solutions, enabling organisations to track, understand, ...
www.belux.businessobjects.com/

On-Demand Business Intelligence from Business Objects
With on-demand business intelligence, you can deploy a BI solution over the Web - without having to buy servers, install software, or start an IT project.
www.ondemand.com/

Business Objects Dives Into Predictive Analytics -- Predictive ...
Jun 11, 2008 ... The SAP subsidiary's first predictive analytics module takes direct aim at the market dominated by SAS Institute.
www.informationweek.com/news/business_intelligence/analytics

DETERMINATION OF GRAPHICAL FORMAT TO PRESENT SEARCH RESULTS

BACKGROUND

Systems to search electronic information are well known. Generally, a client transmits search terms to a search engine and receives search results in response. The search engine may search any type of data and/or database structure and generate the search results based on the search.

Each of the search results received by the client identifies an electronic item (e.g., a Web page, a document, a report, a personal profile). Each search result also includes metadata describing the search result. The metadata may include a title of the item, a measure of the relevancy of the search result to the search terms, a creation date of the item, or the like.

Search results are typically displayed in a list format, in order of relevancy. Some systems use other formats to display search results, such as a timeline format or a geographical format. However, the format in which search results are presented might not be particularly suited to viewing the search results and/or to the context in which the search was performed. Systems are desired for improving the presentation of search results.

BRIEF DESCRIPTION OF THE DRAWINGS

FIG. 4 is a view of search results presented in a list format.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
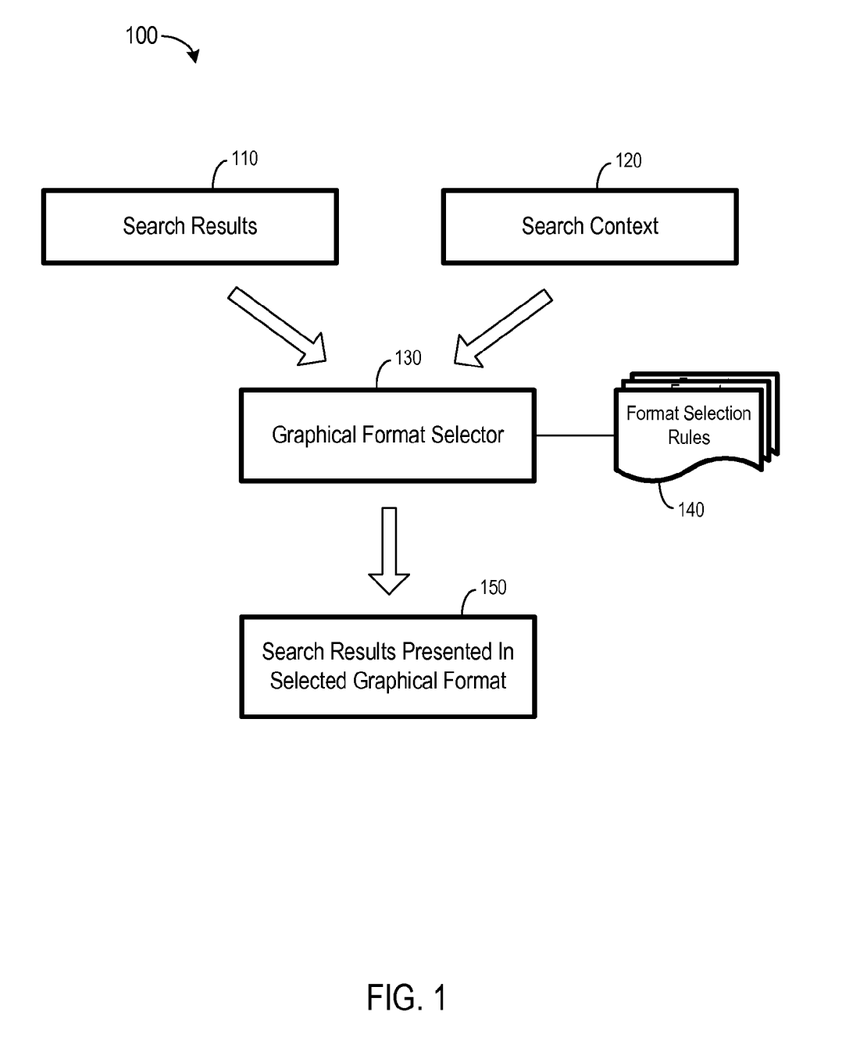
FIG. 1 is a functional block diagram illustrating operation according to some embodiments.

FIG. 1 illustrates functional block diagram 100 according to some embodiments. As shown, diagram 100 includes search results 110 and search context 120. Search results 110 may be received from any system providing search results, including but not limited to a Web-based search engine (e.g., Google, Yahoo, etc.), an enterprise search engine (e.g., BusinessObjects Intelligent Search), and a local search engine (e.g., Windows Desktop Search). Each of search results 110 may comprise any type of electronic information and/or a link thereto. One or more of search results 110 may be associated with metadata as described above. Moreover, search results 110 may be associated with metadata describing search results 110 as a whole (e.g., a total number of search results 110, a distribution of search results 110, and a breakdown of search results 110 by type).

Search context 120 may comprise metadata specifying a context associated with search results 110. Search context 120 may include, but is not limited to, user profile information (e.g., graphical format preferences, nationality, job function), search history information (e.g., last-used graphical format, most-used graphical format), search path information (e.g., search initiated from contact manager or repository explorer application), and search control information (e.g., sort results by title, sort results by date). Search context 120 and search results 110 are received by graphical format selector 130.

Graphical format selector 130 may comprise any suitable combination of hardware and/or software to select a graphical format in which to present search results 110 based on associated metadata. Graphical format selector 130 may select the graphical format from any of a plurality of formats, including but not limited to a list format, a linear (e.g., timeline) format, a two-dimensional linear format, a human network format, and a geographical format. According to some embodiments, graphical format selector 130 is an element of a client application which also receives a search query from a user, transmits the search query to a search engine, and receives search results 110.

Graphical format selector 130 selects a graphical format based on metadata of search results 110 and format selection rules 140. Each of format selection rules 140 may be associated with a respective weighting. For example, graphical format selector 130 may evaluate a first format selection rule 140 as indicating that a list format should be selected, and may evaluate a second format selection rule 140 as indicating that a geographical format should be selected. If the second format selection rule 140 is associated with a greater weighting than the first format selection rule 140, graphical format selector 130 selects the geographical format. Examples of format selection rules 140 according to some embodiments are provided below.

Diagram 100 also illustrates search results 150 presented in a selected graphical format. More specifically, search results 110 are presented at 150 in the graphical format selected by graphical format selector 130. In some embodiments, the selected graphical format is transmitted to an appropriate rendering engine to render and present search results 110.

Figure 2:
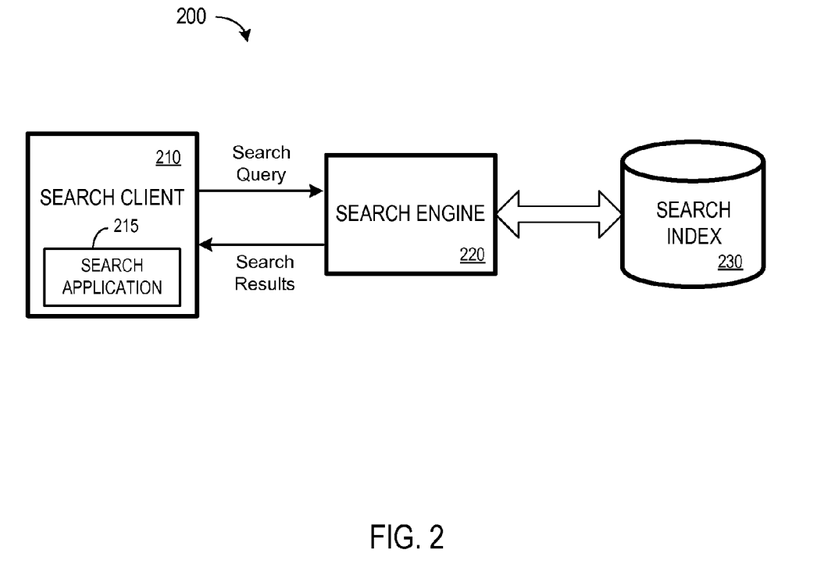
FIG. 2 is a block diagram of a system according to some embodiments.

FIG. 2 comprises a block diagram of system 200 to implement the functions depicted in FIG. 1 according to some embodiments.

Search client 210 may comprise any suitable device, such as a desktop computer, a laptop computer, a personal digital assistant, a tablet PC, and a smartphone. Search client 210 may execute program code of search application 215 to perform some of the processes described herein. For example, search application 215 may execute to present a search interface to a user, to receive a search query entered into the search interface, and to transmit the search query to search engine 220. Search application 215 may comprise a rich client application, an applet in a Web browser, or any other type of application.

Search engine 220 receives the search query and formulates search results according to any known, proprietary, or other procedure. Such a procedure may include acquiring data from search index 230. Search index 230 may provide an index of searchable items (e.g., a Web page, a document, a report, a personal profile) and metadata values associated with each item. Search engine 220 may assist in the creation of search index 230. Embodiments may operate in conjunction with any system for providing search results.

Search engine 220 returns search results to client device 210. Search application 215 then selects a graphical format in which to present the received search results based on metadata associated with the search results. Search application

215 may select the graphical format based on hard-coded and/or custom format selection rules.

Figure 3:
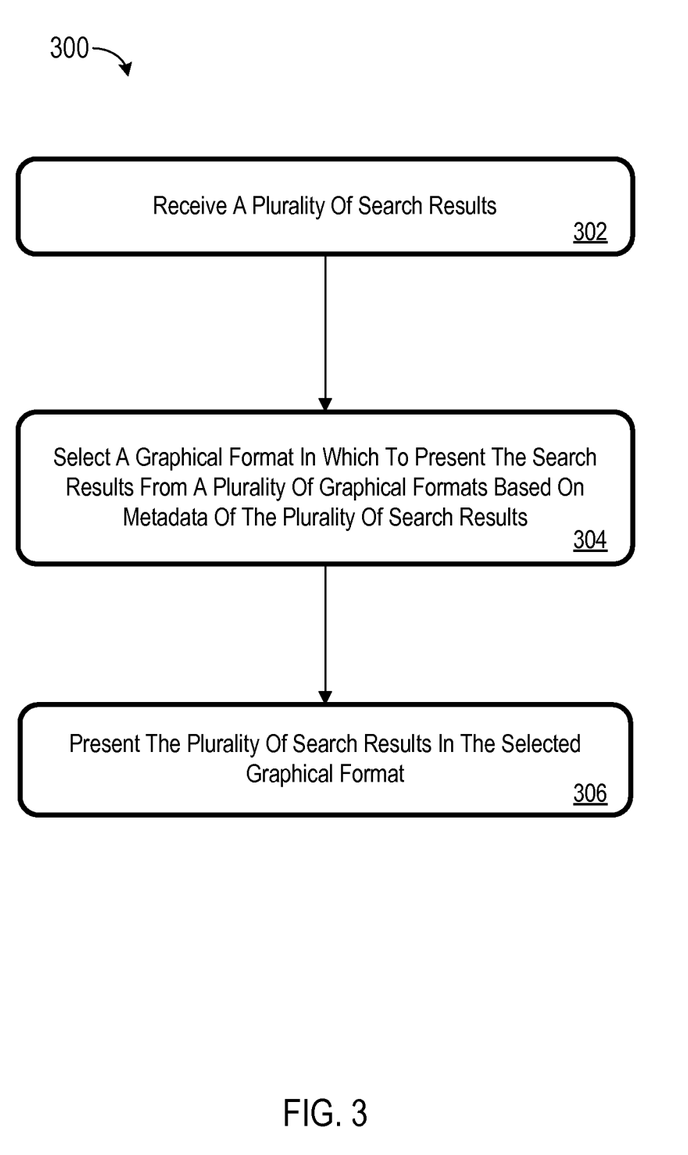
FIG. 3 is a flow diagram of a process according to some embodiments.

FIG. 3 is a flow diagram of process 300 according to some embodiments. Process 300 may be executed by hardware and embodied in program code stored on a tangible computer-readable medium. Client device 210 may execute search application 215 to perform process 200, but embodiments are not limited thereto.

Initially, a plurality of search results is received at 302. The search results may be received from a search engine in response to a previously-transmitted search query. The search results may comprise a pointer (e.g., a hyperlink) to an actual item and/or the item itself. Each of the plurality of search results may be associated with zero or more types of metadata, such as, but not limited to, a relevancy, a title, a date and a result type (e.g., document, address, personal profile).

Next, at 304, a graphical format in which to present the search results is selected. The graphical format is selected from a plurality of graphical formats based on metadata of the plurality of search results. Various graphical formats from which the graphical format may be selected will now be described with respect to FIGS. 4 through 8. Embodiments are not limited to the types of graphical formats described herein, or to the particular examples of the described types.

FIG. 4 illustrates a conventional list format for presenting search results. Each search result of FIG. 4 includes a title (which also serves as a link to a Web page or other document), a text summary, a relevancy and a date. The relevancy and/or the date may or may not be displayed to the user. The search results may be ordered by relevancy, date, or according to some other metadata. Accordingly, selection of a graphical format at 304 may comprise selection of other parameters of the graphical format, such as "sort by" parameters.

Figure 5:
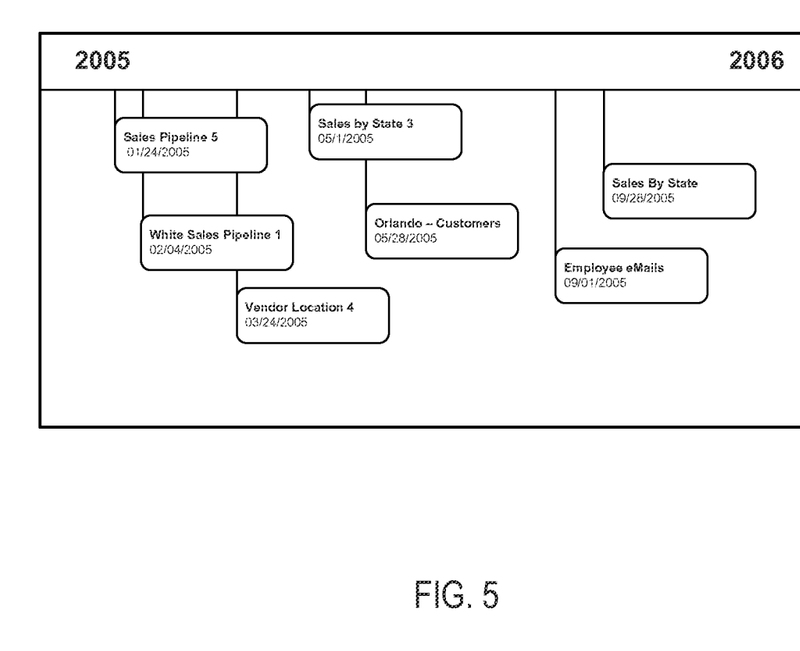
FIG. 5 is a view of search results presented in a timeline format.

FIG. 5 illustrates a timeline format presenting search results along an axis representing time. Embodiments may include graphical formats in which search results are presented along an axis representing metadata other than time. For example, search results may be ordered according to relevancy along a "relevancy" axis.

Figure 6:
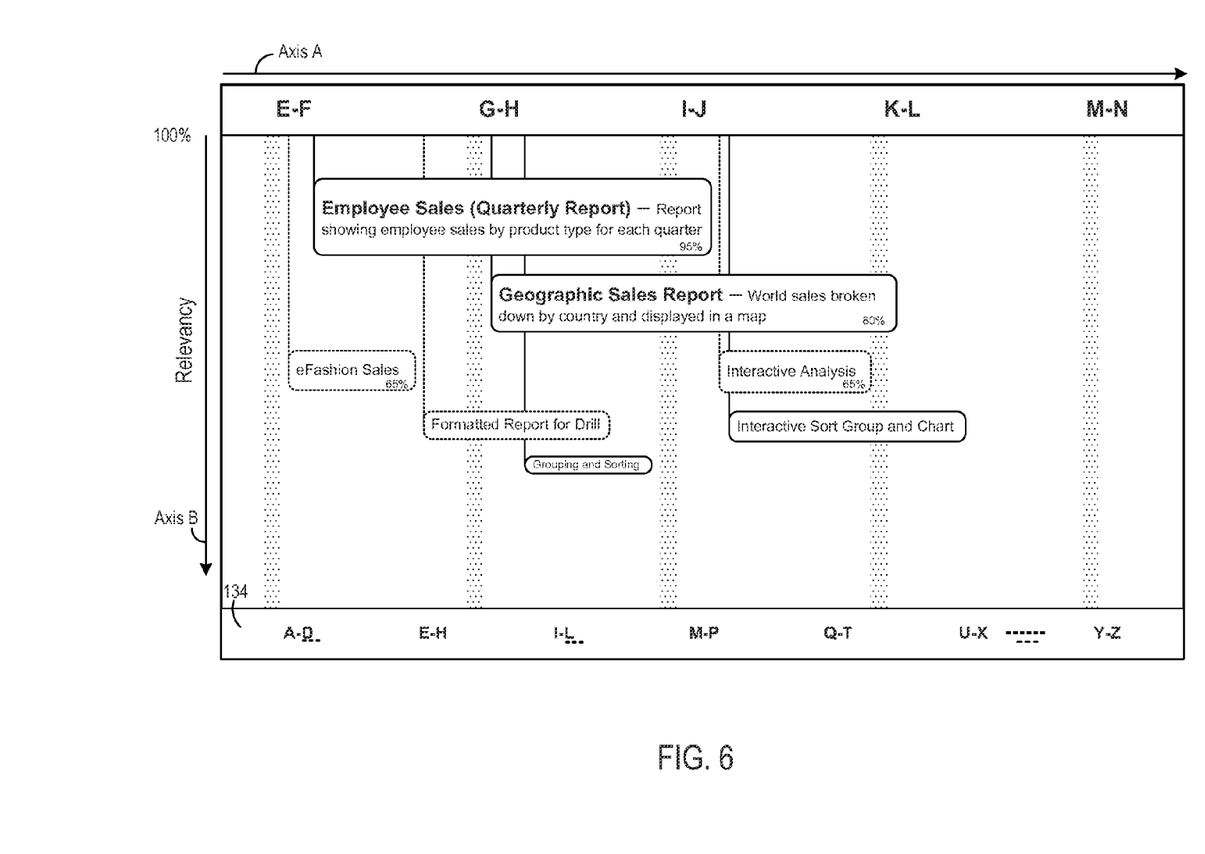
FIG. 6 is a view of search results presented in a two-dimensional linear format.

FIG. 6 is a graphical format described in co-pending U.S. application Ser. No. 12/250,733, entitled "Enhanced Linear Presentation of Search Results Based on Search Result Metadata". As described therein, each search result is associated with at least a first type of metadata and a second type of metadata. Moreover, a graphical indication of each search result is located at coordinates ($A_x$, $B_x$) of a coordinate system comprising axis A and axis B. Axis A represents the first type of metadata and axis B represents the second type of metadata. For each search result, the coordinate $A_x$ is based on a value of the first type of metadata and the coordinate $B_x$ is based on a value of the second type of metadata.

The first type of metadata in the FIG. 6 example is title metadata, and the second type of metadata is relevancy metadata. Accordingly, a horizontal position of a graphical indication represents a first letter of the associated search result's title, and a vertical position of the graphical indication represents a relevancy of the associated search result. A size of each of graphical indication is also based on the relevancy value of the associated search result. Of course, some embodiments may use vertical positioning to represent a first letter of an associated search result's title (or any other type of metadata) and horizontal positioning to represent relevancy (or any other type of metadata) of the associated search result.

Figure 7:
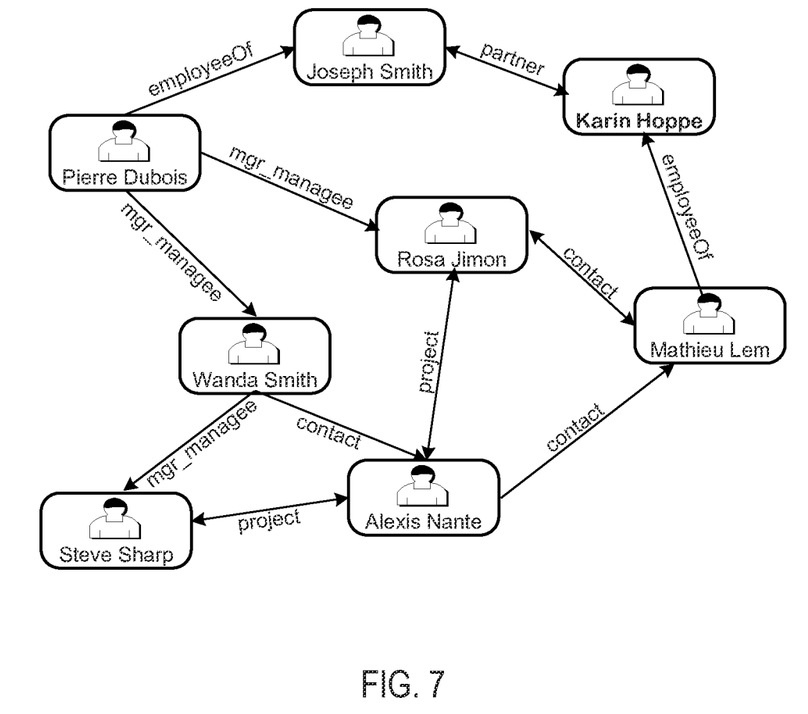
FIG. 7 is a view of search results presented in a human network format.

FIG. 7 illustrates a human network graphical format. Each of the depicted search results may correspond to a person, such as an employee within a particular organization. Relations between each person are depicted with arrows and text, but embodiments are not limited thereto.

Figure 8:
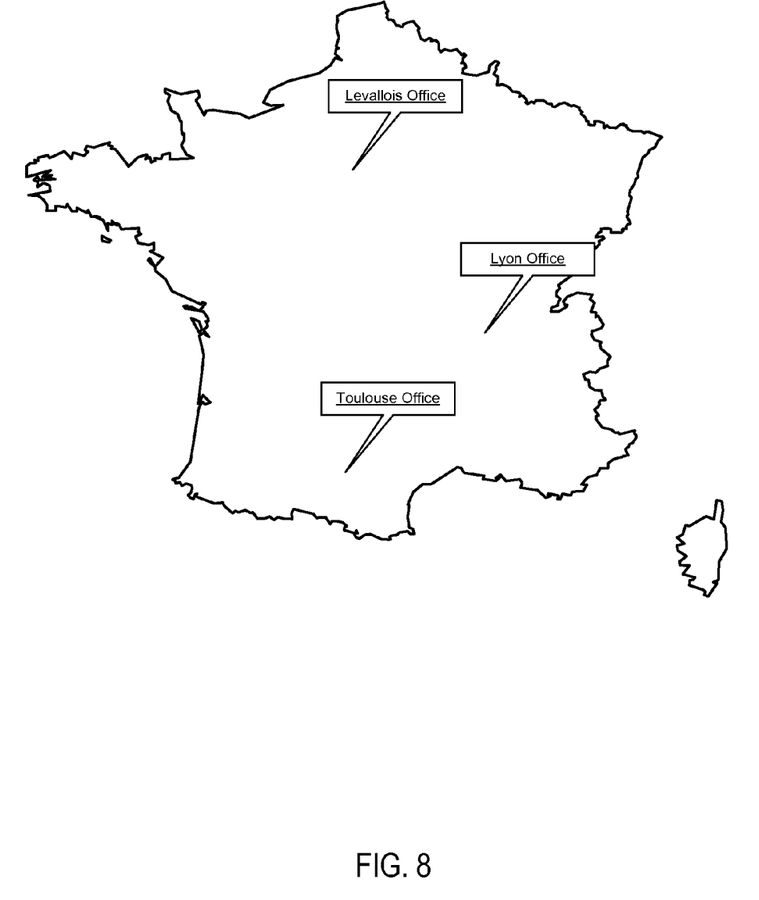
FIG. 8 is a view of search results presented in a geographical format.

FIG. 8 shows graphical indications of search results displayed in a geographical format. Each search result is associated with a particular geographic location. Each search result may correspond to an entity which is located at its associated geographic location.

Returning to process 300, selection of the graphical format at 304 may proceed in any manner and be based on any type of search result metadata that is or becomes known. Examples of metadata may include the number of search results (ten, twenty thousand, etc.), a breakdown of the search results by type (20% documents, 30% contacts, 40% addresses, etc.), and a distribution of the search results with respect to a particular metadata type (e.g., evenly distributed over Title type metadata).

Selection of the graphical format at 304 may also be based on any search context information, including but not limited to that described above with respect to FIG. 5. In some embodiments, each of a plurality of graphical formats is assigned a score at 304 based on the metadata and search context, and one of the graphical formats is selected based on the assigned scores.

According to one specific example of 304, it is assumed that the user of client device 210 has specified particular metadata based on which the received search results should be listed. The particular metadata may be specified in a user profile associated with the user. In such a case, and according to the present example, a format selection rule may dictate that the search results are to be displayed in a linear format if the search results are uniformly distributed over the particular metadata, and in a list format otherwise.

The uniformity of the distribution may be determined in any suitable manner, including an information entropy calculation. In this regard, the information entropy of a discrete random variable X, that can take on possible values $\{x_1, \ldots, x_n\}$ is $$H(X) = E(I(X)) = -\sum_{i=1}^{n} p(x_i) \log p(x_i)$$

where I(X) is the information content or self-information of X, which is itself a random variable, E(X) is the expected value function, $p(x_i)=Pr(X=x_i)$ is the probability mass function of X, 0 log 0 is taken to be 0, and the logarithm is usually taken to base 2 (resulting in an entropy value in bits).

If the uniformity of the distribution over the particular metadata is greater than a threshold value, the search results may be presented at 306 along a single axis representing the particular metadata. Alternatively, the search results may be presented in a graphical format as shown in FIG. 6, with the results appropriately positioned along a first axis representing the particular metadata and along a second axis representing other metadata.

According to some embodiments, a geographical format is selected at 304 if the search results comprise addresses associated with relevances greater than a threshold relevance, and if the search was initiated from a global positioning system application (e.g., according to search context 120). A human network format may be selected at 304 if the most relevant of the received search results are people (or other organizational entities) related to one another and if the search was initiated from a contact manager application.

Generally, a particular graphical format may be selected at 304 if the user previously selected the particular format for a previous and identical search. In this regard, some embodiments may allow the user to select a different graphical format after the search results are initially presented in the selected graphical format at 306. The search results are then displayed in the different graphical format.

Although the foregoing description relates to the display of search results, embodiments are not limited thereto. Embodiments may include querying a semantic layer of an enterprise system, receiving objects and measures in response, selecting a graphical format in which to present the objects based on the measures, and presenting the objects in the selected graphical format.

The embodiments described herein are solely for the purpose of illustration. Those in the art will recognize that other embodiments may be practiced with modifications and alterations limited only by the claims.

What is claimed is:

1. A method comprising:
    receiving, by a processor, a plurality of search results;
    selecting, by the processor, a graphical format in which to present the search results from a plurality of graphical formats based on metadata of the plurality of search results;
    presenting the plurality of search results in the selected graphical format;
    wherein the selecting the graphical format comprises:
        determining a first type of metadata based on which the plurality of search results are to be ordered;
        determining a distribution of the plurality of search results along the first type of metadata;
        selecting a linear graphical format if a uniformity of the distribution is greater than a threshold value; and
        selecting a list format that is different than the linear graphical format if the uniformity of the distribution is not greater than the threshold value;
        wherein the linear graphical format includes an axis representing the first type of metadata; and
        wherein the list format does not include an axis representing the first type of metadata;
    the method further comprising:
        determining, by the processor, the uniformity of the distribution using an information entropy calculation, wherein information entropy is calculated as being the expectation value of the information content, the information content expressed as information entropy, wherein information entropy is proportional to the negative of a sum of a set of products wherein the set of products are proportional to the product of: a set of probabilities of a set of states, and a set of logarithms of the set of probabilities of the set of states.

2. A method according to claim 1, wherein the first type of metadata comprises at least one of a total number of the plurality of search results, a distribution of the plurality of search results, and types of the plurality of search results.

3. A method according to claim 2, further comprising:
    receiving a search query from a user,
    wherein selecting the graphical format further comprises:
        selecting the graphical format based on at least one of a user search history associated with the user, a profile of the user, and an application context from which the search query was received.

4. A method according to claim 1, further comprising:
    receiving a search query from a user,
    wherein selecting the graphical format further comprises:
        selecting the graphical format based on at least one of a user search history associated with the user, a profile of the user, and an application context from which the search query was received.

5. A method according to claim 1, wherein selecting the graphical format further comprises:
    determining that a plurality of the plurality of search results comprise addresses, each of the plurality of the plurality of search results associated with a respective relevance greater than a threshold relevance; and
    selecting a geographical format to present the plurality of the plurality of search results.

6. A method according to claim 5, wherein selecting a geographical format to present the plurality of the plurality of search results comprises:
    selecting the geographical format to present the plurality of the plurality of search results in response to determining that the search results were generated in response to a search initiated from a global positioning system application and that the respective address of each of the plurality of the plurality of search results is associated with the respective relevance of the plurality of the plurality of search results that is greater than the threshold relevance.

7. A method according to claim 1, wherein selecting the graphical format further comprises:
    determining a plurality of scores based on the metadata of the plurality of search results;
    assigning each of the plurality of scores to a respective one of the plurality of graphical formats; and
    selecting the graphical format from the plurality of graphical formats based on the assigned plurality of scores.

8. A method according to claim 1, wherein the axis included in the linear graphical format is a first axis; and
    wherein selecting the linear graphical format if the uniformity of the distribution is greater than the threshold value comprises:
    selecting a graphical format in which results are positioned along the first axis representing the first type of metadata and along a second axis representing other metadata if the uniformity of the distribution is greater than the threshold value.

9. A method according to claim 1, wherein the first type of metadata is time metadata.

10. A method according to claim 1, wherein the first type of metadata is relevancy metadata.

11. A method according to claim 1, wherein the first type of metadata is title metadata.

12. A method according to claim 1, wherein the first type of metadata is result type metadata.

13. A method according to claim 1, wherein the determining, by the processor, the uniformity of the distribution using an information entropy calculation, wherein information entropy is calculated as being the expectation value of the information content, the information content expressed as information entropy, wherein information entropy is proportional to the negative of a sum of a set of products wherein the set of products are proportional to the product of: a set of probabilities of a set of states, and a set of logarithms of the set of probabilities of the set of states, comprises:
    determining, by the processor, the uniformity of the distribution using an information entropy calculation, wherein information entropy is calculated as:

$$H(X) = E(I(X)) = -\sum_{i=1}^{n} p(x_i)\log p(x_i)$$

and
wherein
X is a discrete random variable that can take on possible values $\{x_1, \ldots, x_n\}$,
I(X) is an information content or self-information of X,
E(X) is an expected value function, and
$p(x_i)=\Pr(X=x_i)$ is a probability mass function of X.

14. A non-transitory medium storing computer-executable program code, the program code executable by a computer to:
receive a plurality of search results;
select a graphical format in which to present the search results from a plurality of graphical formats based on metadata of the plurality of search results; and
present the plurality of search results in the selected graphical format;
wherein the program code executable by a computer to select the graphical format comprises program code executable by a computer to:
determine a first type of metadata based on which the plurality of search results are to be ordered;
determine a distribution of the plurality of search results along the first type of metadata;
select a linear graphical format if a uniformity of the distribution is greater than a threshold value; and
select a list format that is different than the linear graphical format if the uniformity of the distribution is not greater than the threshold value;
wherein the linear graphical format includes an axis representing the first type of metadata; and
wherein the list format does not include an axis representing the first type of metadata;
wherein the program code executable by a computer to select the graphical format further comprises program code executable by a computer to:
determine the uniformity of the distribution using an information entropy calculation, wherein information entropy is calculated as being the expectation value of the information content, the information content expressed as information entropy, wherein information entropy is proportional to the negative of a sum of a set of products wherein the set of products are proportional to the product of: a set of probabilities of a set of states, and a set of logarithms of the set of probabilities of the set of states.

15. A medium according to claim 14, wherein the first type of metadata comprises at least one of a total number of the plurality of search results, a distribution of the plurality of search results, and types of the plurality of search results.

16. A medium according to claim 15, the program code further executable by a processor to:
receive a search query from a user,
wherein selection of the graphical format further comprises:
selection of the graphical format based on at least one of a user search history associated with the user, a profile of the user, and an application context from which the search query was received.

17. A medium according to claim 14, the program code further executable by a processor to:
receive a search query from a user,
wherein selection of the graphical format futher comprises:
selection of the graphical format based on at least one of a user search history associated with the user, a profile of the user, and an application context from which the search query was received.

18. A medium according to claim 14, wherein selection of the graphical format further comprises:
determination that a plurality of the plurality of search results comprise addresses, each of the plurality of the plurality of search results associated with a respective relevance greater than a threshold relevance; and
selection of a geographical format to present the plurality of the plurality of search results.

19. A medium according to claim 18, wherein selection of a geographical format to present the plurality of the plurality of search results comprises:
selection of the geographical format to present the plurality of the plurality of search results in response to determination that the search results were generated in response to a search initiated from a global positioning system application and that the respective address of each of the plurality of the plurality of search results is associated with the respective relevance of the plurality of the plurality of search results that is greater than the threshold relevance.

20. A medium according to claim 14, wherein the program code executable by a computer to select a graphical format in which to present the search results from a plurality of graphical formats comprises program code executable by a computer to:
determine a plurality of scores based on the metadata of the plurality of search results;
assign each of the plurality of scores to a respective one of the plurality of graphical formats; and
select the graphical format from the plurality of graphical formats based on the assigned plurality of scores.

21. A medium according to claim 14, wherein the axis included in the linear graphical format is a first axis; and
wherein selection of the linear graphical format if the uniformity of the distribution is greater than the threshold value comprises:
selection of a graphical format in which results are positioned along the first axis representing the first type of metadata and along a second axis representing other metadata if the uniformity of the distribution is greater than the threshold value.

22. A medium according to claim 14, wherein the first type of metadata is time metadata.

23. A medium according to claim 14, wherein the first type of metadata is relevancy metadata.

24. A medium according to claim 14, wherein the first type of metadata is title metadata.

25. A medium according to claim 14, wherein the first type of metadata is result type metadata.

26. A medium according to claim 14, wherein the determine the uniformity of the distribution using an information entropy calculation, wherein information entropy is calculated as being the expectation value of the information content, the information content expressed as information entropy, wherein information entropy is proportional to the negative of a sum of a set of products wherein the set of products are proportional to the product of: a set of probabilities of a set of states, and a set of logarithms of the set of probabilities of the set of states comprises:
determine the uniformity of the distribution using an information entropy calculation, wherein information entropy is calculated as:

$$H(X) = E(I(X)) = -\sum_{i=1}^{n} p(x_i) \log p(x_i)$$

and
wherein
X is a discrete random variable that can take on possible values $\{x_1, \ldots, x_n\}$,
I(X) is an information content or self-information of X,
E(X) is an expected value function, and
$p(x_i) = \Pr(X = x_i)$ is a probability mass function of X.

27. A device comprising:
a processor to receive a plurality of search results and select a graphical format in which to present the search results from a plurality of graphical formats based on metadata of the plurality of search results; and
a display to present the plurality of search results in the selected graphical format;
wherein the processor to select a graphical format in which to present the search results from a plurality of graphical formats based on metadata of the plurality of search results comprises;
a processor to determine a first type of metadata based on which the plurality of search results are to be ordered, determine a distribution of the plurality of search results along the first type of metadata, select a linear graphical format if a uniformity of the distribution is greater than a threshold value, and select a list format that is different than the linear graphical format if the uniformity of the distribution is not greater than the threshold value;
wherein the linear graphical format includes an axis representing the first type of metadata; and
wherein the list format does not include an axis representing the first type of metadata;
wherein the processor to determine a first type of metadata based on which the plurality of search results are to be ordered, determine a distribution of the plurality of search results along the first type of metadata, select a linear graphical format if a uniformity of the distribution is greater than a threshold value, and select a list format that is different than the linear graphical format if the uniformity of the distribution is not greater than the threshold value, is further to:
determine the uniformity of the distribution using an information entropy calculation, wherein information entropy is calculated as being the expectation value of the information content, the information content expressed as information entropy, wherein information entropy is proportional to the negative of a sum of a set of products wherein the set of products are proportional to the product of: a set of probabilities of a set of states, and a set of logarithms of the set of probabilities of the set of states.

28. A device according to claim 27, wherein the first type of metadata is time metadata.

29. A device according to claim 27, wherein the first type of metadata is relevancy metadata.

30. A device according to claim 27, wherein the first type of metadata is title metadata.

31. A device according to claim 27, wherein the first type of metadata is result type metadata.

32. A device according to claim 27, wherein the determine the uniformity of the distribution using an information entropy calculation, wherein information entropy is calculated as being the expectation value of the information content, the information content expressed as information entropy, wherein information entropy is proportional to the negative of a sum of a set of products wherein the set of products are proportional to the product of: a set of probabilities of a set of states, and a set of logarithms of the set of probabilities of the set of states comprises:
determine the uniformity of the distribution using an information entropy calculation, wherein information entropy is calculated as:

$$H(X) = E(I(X)) = -\sum_{i=1}^{n} p(x_i) \log p(x_i)$$

and
wherein
X is a discrete random variable that can take on possible values $\{x_1, \ldots, x_n\}$,
I(X) is an information content or self-information of X,
E(X) is an expected value function, and
$p(x_i) = \Pr(X = x_i)$ is a probability mass function of X.

* * * * *